Dec. 7, 1948.  H. KRAUSS  2,455,590
TEMPERATURE LIMITING HOT WATER SYSTEM SUPPLY
Filed June 18, 1946
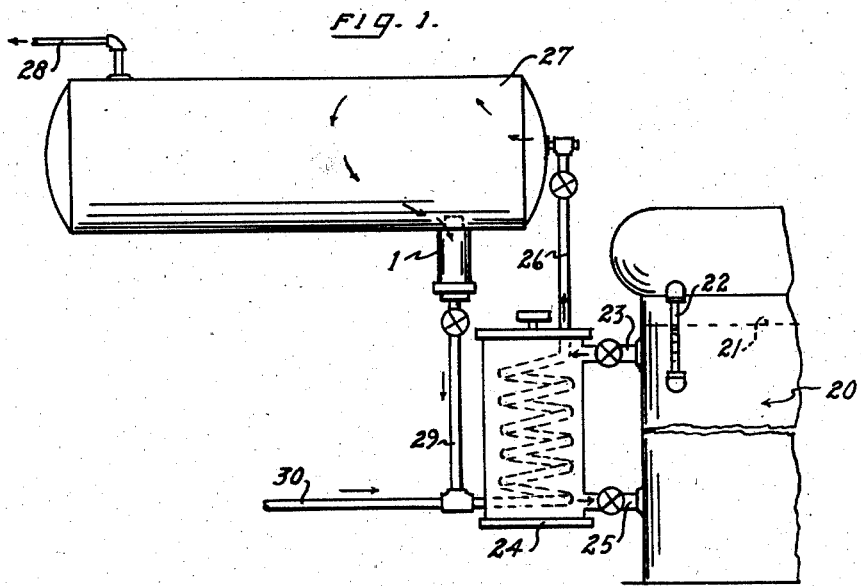
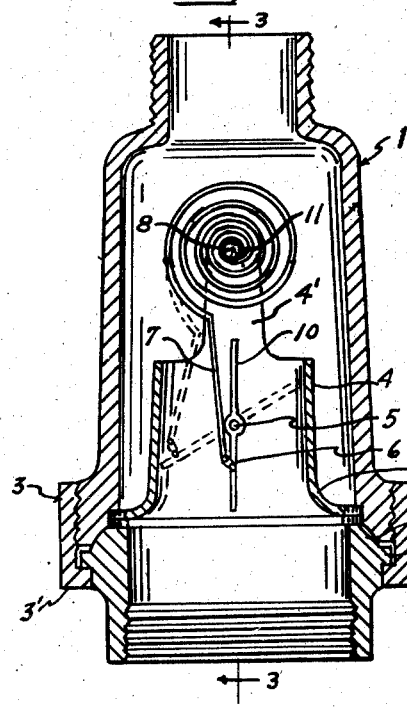
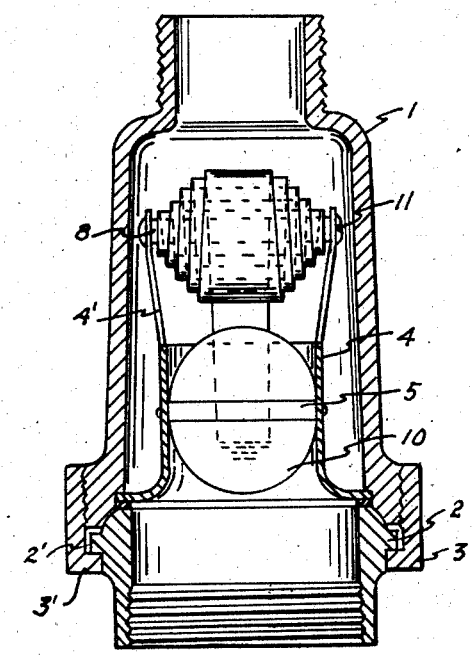
INVENTOR
HERBERT KRAUSS
BY
Howard J. Jeandron
ATTORNEY

UNITED STATES PATENT OFFICE 2,455,590

TEMPERATURE LIMITING HOT-WATER SYSTEM SUPPLY

Herbert Krauss, Woodside, N. Y.

Application June 18, 1946, Serial No. 677,606

1 Claim. (Cl. 236—19)

This invention relates to a system for reducing or completely stopping the flow of a fluid through a confining channel such as a pipe, when the temperature of the fluid increases to a predetermined value. More particularly, this invention pertains to an arrangement of a valve and an actuating thermostat therefor, within a pipe through which a fluid, more especially a liquid, is flowing.

This invention is particularly adapted to be used in conjunction with hot water supply systems, for either domestic or commercial use, and when so used acts to maintain an upper temperature limit, beyond which the water which is supplied to the user may not pass.

As one example of the uses to which this invention may be put, the domestic water supply system of the type yielding a continuous flow of hot water from a storage tank, which latter in turn is fed with water which has been indirectly heated from an external source such as a steam or hot water boiler, may be cited. In domestic use, a hot water system of the type just identified usually utilizes as a primary source of heat the same boiler which is used to supply hot water or steam to space heating radiating systems, such as the familiar radiator type. Under conditions of relatively great changes in the level of external temperature, for example, predicated upon seasonal cycles, the amount of heat afforded by the boiler is subject to extreme fluctuations, as the radiating system may demand the maximum output of the boiler upon a sub-zero winter day, and during the summer months the radiating system draws no heat from the boiler, which latter is accordingly operated at a combustion level just sufficient to supply heat to the hot water system.

The known art discloses the use of a gate valve in the circulatory system to retard the rate of replacement of hot water in the storage tank. This manually operated gate valve is set and is usually so positioned that it restricts the circulation of the heated water to prevent overheating of the water during normal periods when there is very little hot water withdrawn from the system. However, this has a decided defect, that is, in periods of large consumption of hot water from the system the circulation of the cold water supplied through the heating unit remains restricted and the rate of circulation is retarded. Therefore, there is considerable time necessary in which to resupply the hot water that has been withdrawn from the system. Whereas, in applicant's device the valve will open and close according to the temperature of the water being circulated when there has been a large withdrawal of hot water and considerable cold water has been replenished into the system, this valve will be wide open and will allow full circulation and also when there is a small amount of hot water withdrawn, this valve will restrict and allow a restricted circulation, so that the supply and demand really control the positioning of the valve.

A further disadvantage of the overheating of the water in the tank is the fact that such elevated temperatures give rise to undue acceleration of the surface deterioration of the interior of the tanks. In the case of the commonly used galvanized iron tank, a maximum temperature of 160° to 180° is recommended, and tanks of such material are in wide use, due to economic considerations, and are usually supplied with the proviso that adequate life expectancy will be obtained only when the temperatures just given are not materially exceeded. The accelerated wear of the tank with temperatures above 180° is such an important factor that manufacturers of this type of tank have been unwilling to recommend their use in automatic heating systems of the type previously described, due to the fact that the temperature reached therein may exceed the safe value, this happening because of the highly variable heat transfer factors, above described.

The present invention replaces the inefficient, awkward, and unsatisfactory control arrangements of the prior art, by a wholly automatic and relatively simple device which will adjust the rate of heat transfer to the storage tank to accord not only with the rate of withdrawal of hot water therefrom, but which also will automatically compensate for changes in the rate at which, or the temperature at which heat is available from the source, thus taking care of the seasonal fluctuations previously described.

One object of this invention is to provide a hot water system in which the temperature of stored water is kept below a predetermined value at all times.

Another object of this invention is to provide a fluid heating and supply system in which the rate of heat transfer between the source and the storage tank is automatically adjusted in accordance with the rate at which heat is available from the source, so that, below a given maximum, heat units are supplied to the tank at just the rate needed to maintain the temperature of the stored fluid at a uniform predetermined level.

Yet another object of this invention is to supply a self-contained fluid valve and thermostat actuated by the fluid passing through the valve, in which rise of temperature beyond a predetermined point causes partial or complete closure of the valve.

A yet further purpose of the present invention is to provide a domestic water heating system in which a relatively simple and wholly automatic control valve provides to the user thereof an adequate supply of hot water, maintained at a substantially uniform temperature, and in any event, never exceeding a predetermined temperature level.

Further purposes and advantages of this invention will be apparent from the following specification, and from the hereunto annexed drawings, forming a portion thereof.

In the drawings:

Fig. 1 is a partly schematic showing of a system according to this invention,

Fig. 2 is a cross sectional elevation of one form of automatic valve suited for use in the system of this invention, and Fig. 3 is a similar cross sectional elevation of the valve taken on line 3—3 of Fig. 2.

For clarity, reference is first made to the valve shown in Figs. 2 and 3. The body portion 1, is affixed to the inlet portion 2, by means of a coupling member 3, having a portion 3', hooked over a projecting collar 2' of portion 2, suitable threads being provided upon the various parts, for fastening to one another, and to the inlet and outlet pipes to which the valve as a whole is connected.

The stationary portion of the valve proper is constituted by a hollow cylindrical element 4, through the interior of which all the fluid passes. Within this cylinder is mounted a butterfly type movable valve member 10, upon a pivot 5. A suitable connecting joint 6, couples member 10, via a bi-metallic thermostatic coiled spring 7, to a fixed axial member 8. Cylinder 4 is supported from the interior surface of the valve by a peripheral collar extension 9, while the inner end of spring 7 is firmly affixed to axis 8, the latter being held by screws 11 to an upwardly extending prolongation 4' of cylinder 4, this latter extension only occupying so much of a complete circle as may be needed to afford sufficient rigidity to the structure, and not constituting any substantial hinderance to the flow of water through the valve when the butterfly valve member 10 is wide open.

The arrangement of the bi-metallic coiled strip is such that at temperatures below a predetermined minimum it will hold the valve completely open, while above such minimum it will contract and coil around axis 8 to a greater or less degree, thereby moving member 10 towards the completely closed position indicated in Fig. 2 by the dotted lines. The adjustment of the thermostatic spring is such that complete closure of the valve takes place at a predetermined maximum temperature, such as that of 160° or 180°, previously discussed.

Thermostatic valves somewhat similar to that just described have been employed in hydraulic systems to allow increase of fluid flow upon rise of temperature, for cooling purposes or the like, but the use of this valve to close and reduce or prevent fluid flow therethrough upon increase of temperature is a novel concept, and diametrically opposed to valves of hitherto known types.

Reference is now made to Fig. 1, where a heat source, such as a steam heating boiler, is indicated at 20, the water level being at line 21, showing upon gauge 22. A fluid flow heat transfer circuit is maintained via pipe 23, to heat exchanger 24, and back to the boiler via pipe 25, as indicated by the arrows in the drawing. Since heat exchangers of the type wherein two discrete fluid flow systems are brought into close proximity to one another, in order that thermal units may pass principally by conduction from the system at the higher energy level to that at the lower energy level, are well known in the thermodynamic art, and since a variety of internal constructions thereof may be used, it is considered needless to show the interior of the exchanger in detail.

The fluid flow system at the lower energy level is constituted by pipe 26, carrying water to storage tank 27, whence it is withdrawn by the user, via pipe 28. The return portion of this secondary flow circuit starts from the bottom of tank 27, extending through valve 1, of the type previously described, and via pipe 29 to the inlet of the secondary portion of heat exchanger 24. Water is supplied to the system, to replace that withdrawn via pipe 28, from supply pipe 30, it being understood that the hydrostatic head of the water in the supply system is maintained sufficient to cause discharge of water through pipe 28, to the point of use.

From the foregoing description it will be apparent that there are provided a number of fluid flow systems, some discrete from each other, and others being of the types having portions where the fluids can mix. The first flow system is of the so-called thermo-syphon type, being constituted by the water in the boiler 20, and that in pipes 23 and 25, and the primary portion of the heat exchanger 24. In this system the temperature frequently may rise to a point above 212°, according to the pressure maintained in the boiler. However this high temperature fluid can proceed no farther than the heat exchanger, since this first fluid flow system is not connected with the second thermosyphon system which feeds the storage tank. This second system comprises the secondary portion of exchanger 24, pipes 26 and 29, the valve 1, and the storage tank 27, flow taking place as indicated by the arrows.

The third fluid flow system includes supply pipe 30, a portion of pipe 29, valve 1, tank 27, and discharge pipe 28. It can be seen that a portion of systems two and three are in common, so that it is essential to make sure that the temperature in such common portions does not exceed the desired maximum, even though the independent portions of system two may contain fluid at a higher temperature level.

The operation of this system is relatively simple. No attempt is made to regulate the rate of production of heat, since the heat producer must usually be regulated as to operative rate according to other factors, such as the demands of a space heating system, drawing steam therefrom. Likewise no attempt is made to regulate the flow of heat between the boiler and the exchanger. The water in flow system is at such elevated temperatures and pressures that regulatory mechanisms proposed by the prior art for interposition within such system must be made of relatively great strength, and consequently are economically undesirable.

In this system, valve 1 regulates the flow of water, and consequently the heat transfer, between exchanger 24 and tank 27. There are two distinct factors which govern the operation of this valve. Considering the system when no water is being drawn therefrom, there is no fluid flow through flow system three, so that only water flowing in the thermo-syphon system identified as two, from the bottom of tank 27 to the exchanger, will affect the thermostat in the valve. When the temperature of this water has reached the point for which the thermostat is adjusted, the valve will start to close, closing completely upon still further rise of temperature. Although pipe 26 is still connected to the tank, there will be no heat conveyed thereby, since the circulatory path has been blocked by the closure of valve 1, thereby counter-opposing the pressure due to thermal density differences, which normally establishes such flow. Thereby the temperature of tank 27 can rise no further until it has cooled sufficiently to actuate the thermostat in valve 1, in the opposite direction, when heat will be again transferred to the tank, from the exchanger.

Considering now the situation when the valve 1 has been closed according to the cycle just described, let it be supposed that withdrawal of water from tank 27 be made. This will establish a flow of water from supply pipe 30, via exchanger 24, and pipe 26, since valve 1 blocks off passage of supply water directly into tank 27. This will cause the water replenishing the tank to be subjected to heat transfer from the exchanger, so that no diminution of the tank temperature will occur, as long as the rate of usage does not exceed the capabilities of the exchanger, and the limitations of the heat reaching the exchanger from the source. Again assuming that water is used at a rate faster than that just mentioned, the water arriving at the tank via pipe 26 will be cooler than that already in the tank, so that it will go to the bottom of the tank, and will thereby determine the re-opening of valve 1, which latter will remain open until the previously described condition of thermal equilibrium is once more established in the system, thereby completing the cycle of operation.

While there has been shown and described certain embodiments of this invention it will be apparent to those skilled in the art that many changes and variations thereof are possible. For example this system is not limited to the use of the particular valve herein shown and described, as self contained thermostatic valves of other types are familiar in the art. Likewise the valve of this invention is not limited as to use, to the particular hot water system here shown. Such valve may be employed in any circulatory system wherein a passageway is to be partly or completely blocked when the fluid passing therethrough rises in temperature above a predetermined maximum, a situation which is very common in certain manufacturing arts, such as in industrial chemical operations.

Having described and shown, by way of example and not of limitation, certain embodiments of this invention, the scope thereof is limited only by the hereunto appended claim.

What is claimed is:

In a water heater, in combination with a storage tank, a first and second water pipe, a water outlet pipe connected to said storage tank, said first water pipe connected at one end with said storage tank to deliver water to the interior of said tank, the second water pipe connected at one end with said tank to draw the cooled water from said tank, said first water pipe provided with a heat exchanger connected to a heating source, said second water pipe provided with a thermostatic valve to open or close said water pipe depending upon a pre-determined temperature for operation of said thermostatic valve, said first and second water pipes connected at their opposite ends to a common water supply, means to replenish said storage tank through said first water pipe with hot water from said heat exchanger whenever water is withdrawn from said storage tank, and means to withdraw water from said storage tank to be circulated through said heat exchanger and restored to said storage tank when the temperature of said water drops below a pre-determined temperature.

HERBERT KRAUSS.

REFERENCES CITED

The following references are of record in the file of this patent:

UNITED STATES PATENTS

| Number | Name | Date |
| --- | --- | --- |
| Re. 20,584 | Jorgensen et al. | Dec. 14, 1937 |
| 1,545,938 | Bren | July 14, 1925 |
| 1,761,946 | Wedin | June 3, 1930 |
| 2,051,311 | Moore | Aug. 18, 1936 |
| 2,095,357 | Dube | Oct. 12, 1937 |